United States Patent Office 2,724,166
Patented Nov. 22, 1955

2,724,166

METHODS OF MAKING DENTAL RESTORATIONS

Richard L. Myerson, Newton, Mass., assignor to Myerson Tooth Corporation, Cambridge, Mass., a corporation of Massachusetts No Drawing. Application December 2, 1952,
Serial No. 323,703

10 Claims. (Cl. 25—157)

The present invention relates to methods of making artificial ceramic dental restorations such as teeth, jackets, crowns, inlays, etc. More specifically, it relates to methods of making artificial ceramic dental restorations having a minimum of void volumes therein.

It is well known in the art that in the manufacture of dental restorations such as artificial teeth from ceramic materials containing feldspar silica, kaolin, etc., it is necessary to preform the raw restoration from finely divided ceramic particles, fire the preformed restoration by raising its temperature to a point wherein vitrification of the ceramic material occurs, and, thereafter cool the same, during which cooling the fused ceramic materials solidify to form a solid article with a glazed surface, said article retaining the form of the unfired molded article. It is also well known that restorations, when fired under known firing conditions, contain an undesirable volume of void spaces or bubbles.

These voids or bubbles in the fired restorations are believed to be caused by (1) the inability to completely fill a given volume with the ceramic particles in preforming the raw restoration, (2) the space originally occupied by binder material which is decomposed during the firing, (3) gases from the ceramic particles which are set free during the firing.

These bubbles or voids are disadvantages in fired artificial restorations, such as artificial teeth, because (1) too great a volume of such voids may undesirably decrease the translucence of said teeth, (2) when the glazed surface of the restoration is ground these voids are exposed and the resulting surface is pitted and (3) they weaken color effect of the color additives in the restoration and render coloring more difficult.

In the past, to avoid excessively large void volumes, it has been suggested to utilize larger particles of ceramic materials, thereby obtaining less void volume in the finished article. However, this is unsatisfactory for many known reasons. It has also been suggested in United States Patent 2,597,469 that the firing of restorations may be carried out at subatmospheric pressures. It is assumed in said patent that the gas within the restoration will flow toward the area of low pressure outside of the tooth and will thereby be removed. However, it is very difficult to economically remove substantially all the gaseous material within the restoration, and, since the restoration is solidified during the firing under sub-atmospheric conditions, those gaseous materials which are trapped within the restoration by such solidification are expanded to large volumes due to the fact that they are at low pressures. This may result in undesirable void volumes even if some of the gases are driven out of the restoration.

The present invention provides a new and novel manner of firing artificial ceramic dental restorations to obtain fired dental restorations having a greatly reduced void volume or bubbles and hence being free of the disadvantages of an excess of void volume or bubbles. The present invention also provides a new and novel manner of firing artificial ceramic dental restorations whereby the void volume of the fired restorations may be accurately controlled.

It has been found that the void volume within fired dental restorations can be reduced to a minimum or to whatever volume is desired by carrying out the firing of the restoration at a super-atmospheric pressure after the ceramic materials of the restoration have been fused sufficiently to form a substantially continuous surface of fused material, and during and immediately preceding the solidification of the fused ceramic materials. By a substantially continuous surface of fused material, it is meant a surface that is substantially free from pores or holes communicating the interior of the restoration with the surrounding atmosphere. By the term "solidification" as used herein, it is meant that state at which the material will no longer flow when subjected to the pressure which is being applied at the time. By exposing the fused restoration to super-atmospheric pressures while the temperature is high enough to permit flow of the ceramic materials, such super-atmospheric pressure is transmitted to the gaseous material within the restoration and it is compressed, according to the gas laws, to a smaller volume, the volume to which it is compressed depending upon the super-atmospheric pressure utilized. When the restoration solidifies, the small volume of compressed gas is trapped as such within the restoration. The result is a restoration having a very small void volume.

In a preferred method of firing of the present invention, the restoration is fired under atmospheric conditions until the outer surface is fused over sufficiently to form a continuous surface of fused material, but the final gloss has not been reached. The restoration is then exposed to super-atmospheric pressures, either during the completion of the original firing cycle or in a second firing operation. This super-atmospheric pressure is maintained while sufficient heat is applied to impart the desired gloss and the restoration is subsequently cooled to a state wherein the ceramic material is no longer flowable at the pressure used, at which point the super-atmospheric pressure may be released.

It is preferable when carrying out the processes of the present invention not to apply super-atmospheric pressures to the restoration before the ceramic materials thereof have been fused sufficiently to form a substantially continuous surface of fused material. It appears that if super-atmospheric pressures are applied at that time, the pressure differential between the inside and outside of the restoration will force quantities of air into the porous restoration. It appears also unless such super-atmospheric pressures are released before the material has fused sufficiently to form a substantially continuous surface of fused material, these quantities of air will be sealed in the restoration by such substantially continuous surface. However, once the ceramic materials of the restoration have been sufficiently fused to form a substantially continuous surface or seal of fused material, substantial amounts of gas can no longer be forced into the restoration by the application of super-atmospheric pressures, but rather, such super-atmospheric pressures are transmitted through the flowable material to the gases already contained in the restoration, thereby compressing them.

However, super-atmospheric pressures can be applied during the firing of the restoration and released before the material has been fused sufficiently to form a continuous surface, without materially affecting the void volume of the restoration.

The degree of porosity or the void volume may be controlled by using greater or less super-atmospheric pressures, the greater the pressure the smaller the void volume or porosity, and the less the pressure the greater the void volume or porosity. In applying super-atmospheric pressures during the firing after the surface is fused over and while the tooth is relatively fluid the bubbles or gaseous material in the restoration are condensed or compressed to a point where the pressure inside the bubble approaches that of the external atmosphere. It is probable that during this period, some gases are forced out of the restoration. In accordance with the gas laws, the volume of any gas at constant temperature varies inversely with the pressure on the gas, so that the volume of the voids or bubbles within the restoration varies inversely with the super-atmospheric pressure transmitted to the bubbles through the ceramic material. Thus, if the super-atmospheric pressure is doubled, the void volume of the gas within the bubbles is halved. Once the tooth has been cooled so as to solidify, the small volume of compressed gases are trapped and confined within the restoration and the pressure may be reduced without causing any expansion of the gaseous material.

As pointed out above, the pressure which is applied to the restoration at the time the continuous surface is formed and which seals the restoration against substantial amounts of gas being forced thereinto appears to determine the quantity of gases which are trapped in the restoration. The pressure applied at the time the restoration is solidified appears to determine the volume that such quantity of gas will occupy in the final solidified restoration. If the pressure at the time of the formation of the continuous surface is greater, the amount of gas trapped in the restoration is greater and consequently the subsequent pressure required during solidification to compress such gas so that it will occupy the same volume must be greater than if a lesser pressure is used when the continuous surface is formed.

It is apparent from the above that even super-atmospheric pressures can be used during the formation of the continuous surface so long as the pressure during solidification of the ceramic materials is super-atmospheric and is sufficiently greater than the pressure employed during the formation of the continuous surface to compress to a sufficiently small volume the gases trapped in the restoration by the formation of such surface.

It is also apparent that if the continuous surface is formed at a particular pressure during a preceding firing and cooling step and a greater super-atmospheric pressure is applied during a subsequent firing and cooling step, as referred to in column 2, such greater super-atmospheric pressure can be applied during the entire, or any part of the subsequent firing and cooling step so long as it is applied at least during and immediately preceding the solidification of the ceramic materials during such subsequent firing and cooling step, because once the continuous surface is formed, whether during the same firing and cooling step that the greater superatmospheric pressure is supplied or during a preceding firing and cooling step, the interior of the tooth is effectively sealed against any substantial amount of air being driven thereinto by such super-atmospheric pressure.

Under ordinary atmospheric firing conditions the gaseous material in the bubbles in the restoration are approximately at atmospheric pressure. Since, during the time when the restoration is in a flowable or fluid state, the gaseous material is at atmospheric pressure and thus occupies a volume corresponding to the volume of gas at atmospheric pressure, upon solidification of the restoration, this volume is preserved since the gases are trapped within the solid restoration. However, if an external pressure of 10 atmospheres is applied to the restoration during the time it is in a flowable state and at the time that the ceramic in the restoration solidifies, then the gaseous material or bubbles in the restoration are compressed approximately to one-tenth of the volume which they occupied under atmospheric pressures, and when the restoration is solidified, these small bubbles or this small void volumn (1/10 of the volumn under atmospheric firing conditions) are preserved as such within the restoration and the super-atmospheric pressure may be released without causing the bubbles within the restoration to expand. Thus, it is seen that whereas in the past the principles utilized in attempting to reduce the void volume and bubble size within the restoration have been to drive the gaseous material out of the restoration and to utilize larger ceramic particles so that less gaseous material is trapped in the restoration, the present method, recognizing the difficulties involved in forcing all the gaseous material out of the restoration and in utilizing large ceramic particles, controls the size of the bubbles or void volume in the restoration by means of super-atmospheric pressures to compress the gaseous material in the restoration to whatever size desired. The volume of gaseous material in the restoration is compressed and reduced while the restoration is in a flowable state and the resulting small volumes are preserved upon solidification of the fused restoration.

However, applicant's present invention can be applied with the use of sub-atmospheric pressures. By first exposing the restoration during the firing to sub-atmospheric pressure, until the ceramic material has fused sufficiently to form a substantially continuous surface of fused material, whereby gaseous material is driven out of the porous restoration, and subsequently, after sufficient fusion has occurred to form a substantially continuous surface of fused material and while the restoration is still in a flowable condition but before solidification of the same, exposing the restoration to super-atmospheric pressure, whereby any gaseous material left in the restoration will be compressed to whatever volume is desired, such small volume being preserved upon solidification of the restoration at such super-atmospheric pressure.

The maximum super-atmospheric pressure which can be utilized in the present invention is dependent largely upon the highest practical super-atmospheric pressures which can be economically used. Pressures as high as about 100 atmospheres can be economically utilized. However, pressures between about 5 and about 20 atmospheres are most practical and a pressure of 8 atmospheres has been found very satisfactory.

The peak temperature utilized in the present invention, as is well known in the art, varies, depending upon the materials utilized, the time of firing, the gloss desired, etc.

The ceramic materials of the present invention are comprised of various blends of feldspar, kaolin, and quartz. However, the invention is not limited to such blends. Any enamel simulating ceramic material can be utilized. For example, an enamel simulating material may be used containing substantially all feldspar with the appropriate coloring and opacifying agents, such as titanium dioxide and metal oxides such as manganese dioxide, magnesium oxide, etc., made into a moldable slip by mixing with solutions of gums or starches, flour or the like to form a plastic slip. Similarly a body-forming slip may be used containing as an example, 80% feldspar with 17% silica and 3% kaolin and with the appropriate fluxes, coloring and opacifying agents and mixed with the solution of gums, etc., as above.

A suitable process of molding or preforming the raw, green tooth of the present invention from the finely divided ceramic materials is described in U. S. Patent No. 2,230,164 to Simon Myerson.

Although the present invention is useful for producing any artificial ceramic dental restoration, it is particularly adaptable to the production of artificial ceramic teeth.

*Example 1*

A raw, green ceramic tooth molded in accordance with U. S. Patent No. 2,230,164, was placed in a substantially freely exposed condition on a refractory tray which was covered with a coarse silica material. The tray was placed in a kiln having a heating curve such that the tooth was brought to 2400° F. (high gloss producing peak temperature) in 30 minutes and then allowed to cool at a similar rate. The pressure was maintained at atmospheric pressure during the entire firing cycle. The appearance of the resulting fired tooth under the microscope showed many and large bubbles. Upon grinding the glazed surface, the resulting surface was pitted and marred. The tooth was of moderate transparency.

Example 2

The kiln of Example 1 was equipped by means well known in the art for producing super-atmospheric pressures within the kiln compartment. A preformed raw tooth, the same as in Example 1, was fired at atmospheric pressure, as in Example 1, until the surface of the tooth was fused over so that such surface was continuous. With the formulation under consideration, this took place at approximately 50° F. before the high gloss peak temperature. A pressure of 8 atmospheres was then applied and maintained while the temperature was raised to peak high gloss temperature, 2400° F., and then reduced, until the ceramic material of the tooth was no longer fluid. The resulting tooth had an enamel with glass-like transparency and very much smaller void volume than in Example 1. Upon grinding the glazed surface, the resulting surface was much less pitted than in Example 1.

Example 3

A preformed raw tooth the same as in Example 1 was fired as in Example 2 except that 10 atmospheres was utilized rather than 8 atmospheres. The resulting tooth had a smaller void volume than in Example 2. Upon grinding the glazed surfaces, the resulting surfaces were less pitted than in Example 2.

Example 4

A raw tooth, the same as in Example 1, was fired under atmospheric pressure as in Example 1, except that a reduced maximum temperature was utilized wherein the tooth was fused over but not brought to a final gloss. The resulting low gloss tooth was then refired at 8 atmospheres of pressure in a kiln constructed for the use of super-atmospheric pressures and having the same rate of heating as in Example 1. The peak temperature in the second firing was between 2350° F. and 2400° F. (high gloss peak temperature for the formulation utilized). The pressure of 8 atmospheres was maintained during the cooling until the tooth surface was no longer fluid. The resulting tooth had the same properties as in Example 2.

Example 5

The kiln of Example 2 was equipped with known means for maintaining subatmospheric pressures within the kiln as well as super-atmospheric pressures. A raw tooth the same as that of Example 1 was fired under a pressure of 1 mm. of mercury to within 50° F. of high gloss peak temperature (2400° F.). The remaining portion of the firing cycle (heating to high gloss peak temperature and subsequent cooling) was carried out at a pressure of 8 atmospheres. The resulting tooth had fewer and smaller bubbles than in Examples 2 and 4 and when the glazed surfaces were ground, the resulting surfaces were less pitted than in Example 2 and 4.

Example 6

A raw tooth the same as Example 1 was fired as in Example 2 except that the entire firing cycle was carried out at a pressure of 8 atmospheres. The resulting tooth had the same properties as the tooth of Example 1.

If desired, separate kilns may be used for the low pressure, atmospheric pressure and high pressure portions of the firing or one kiln may be used constructed so that low, atmospheric or high pressures can be alternately maintained therein, as desired.

Atmospheric or sub-atmospheric pressures may be applied during the firing until any time before, or at the time, high gloss peak temperatures are reached, and after solidification of the fused ceramic material, so long as superatmospheric pressures are employed during the period when the tooth is in a flowable state immediately preceding solidification, and, during the solidification of the ceramic material.

Although it has been attempted to explain the theory of the present invention, it is not intended that the invention be limited to such theory.

The theoretical explanations offered herein to account for the phenomena described herein are offered only as those which appear to the applicant as the probable explanation.

It should be understood that the present disclosure is for the purpose of illustration only and that this invention includes all modifications and equivalents which fall within the scope of the appended claims.

I claim:

1. A process for producing dental restorations comprising a ceramic portion, said process comprising at least two firing and cooling steps, one of said firing steps comprising heating said ceramic portion at least until the ceramic materials thereof have fused sufficiently to form a substantially continuous surface of fused material, the other of said firing and cooling steps being susbequent to said first mentioned firing and cooling step and comprising heating said ceramic portion to a temperature at which said ceramic materials are flowable and thereafter cooling said ceramic portion to a temperature at which the ceramic materials are solidified, said ceramic portion being maintained, at least during and immediately preceding said solidification, at a pressure which is super-atmospheric and which is substantially greater than the pressure at which it is maintained during and immediately preceding the formation of said continuous fused surface during said first heating and cooling step.

2. The process of claim 1 wherein said pressure during and immediately preceding the formation of said continuous surface is substantially atmospheric.

3. The process of claim 1 wherein said pressure during and immediately preceding the formation of said continuous surface is sub-atmospheric.

4. The process of claim 1 wherein said dental restoration comprises an artificial tooth.

5. The process of claim 1 wherein said pressure during and immediately preceding the formation of said continuous surface is not substantially greater than atmospheric pressure and said pressure during and immediately preceding said solidification ranges from about 5 to 20 atmospheres.

6. A process for producing dental restorations comprising a ceramic portion, said process comprising heating said ceramic portion at least until the ceramic materials thereof have fused sufficiently to form a continuous surface and cooling the restoration to a temperature at which the fused ceramic materials are solidified, the improvement comprising maintaining said ceramic portion, at least during and immediately preceding said solidification, at a pressure which is super-atmospheric and which is substantially greater than the pressure at which it is maintained immediately preceding and during the formation of said continuous fused surface.

7. The process of claim 6 wherein said pressure during and immediately preceding the formation of said continuous surface is substantially atmospheric.

8. The process of claim 6 wherein said pressure during and immediately preceding the formation of said continuous surface is sub-atmospheric.

9. The process of claim 6 wherein said dental restoration comprises an artificial tooth.

10. The process of claim 6 wherein said pressure during and immediately preceding the formation of said continuous surface is not susbtantially greater than atmospheric pressure and said pressure during and immediately preceding said solidification ranges from about 5 to 20 atmospheres.

References Cited in the file of this patent

UNITED STATES PATENTS

| | | |
|---|---|---|
| 1,218,779 | Crate | Mar. 13, 1917 |
| 1,524,362 | McIntosh | Jan. 27, 1925 |
| 2,535,025 | Schoenberg | Dec. 26, 1950 |

Disclaimer 2,724,166.—*Richard L. Myerson*, Newton, Mass. METHODS OF MAKING DENTAL RESTORATIONS. Patent dated Nov. 22, 1955. Disclaimer filed Dec. 23, 1959, by the assignee, *Myerson Tooth Corporation*.

Hereby enters this disclaimer to claims 6, 7, 8, 9, and 10 of said patent.

[*Official Gazette February 9, 1960.*]